(No Model.) 2 Sheets—Sheet 2.

W. L. SHEPARD.
COMPOUND STEAM ENGINE.

No. 298,630. Patented May 13, 1884.

WITNESSES:
Herman A. Tyler
Alex Ohloson

INVENTOR
Wilbur L. Shepard
BY
Albert H. Walker
ATTORNEY

UNITED STATES PATENT OFFICE.

WILBUR L. SHEPARD, OF HARTFORD, ASSIGNOR TO MORGAN W. BEACH, OF BRISTOL, CONNECTICUT.

COMPOUND STEAM-ENGINE.

SPECIFICATION forming part of Letters Patent No. 298,630, dated May 13, 1884.

Application filed January 30, 1884. (No model.)

*To all whom it may concern:*

Be it known that I, WILBUR L. SHEPARD, of Hartford, Connecticut, have invented a new and useful Compound Steam-Engine, of which the following description and claims constitute the specification, and which is illustrated by the accompanying two sheets of drawings.

This is a high-pressure steam-engine, which uses the steam twice in one cylinder.

Figure 1:
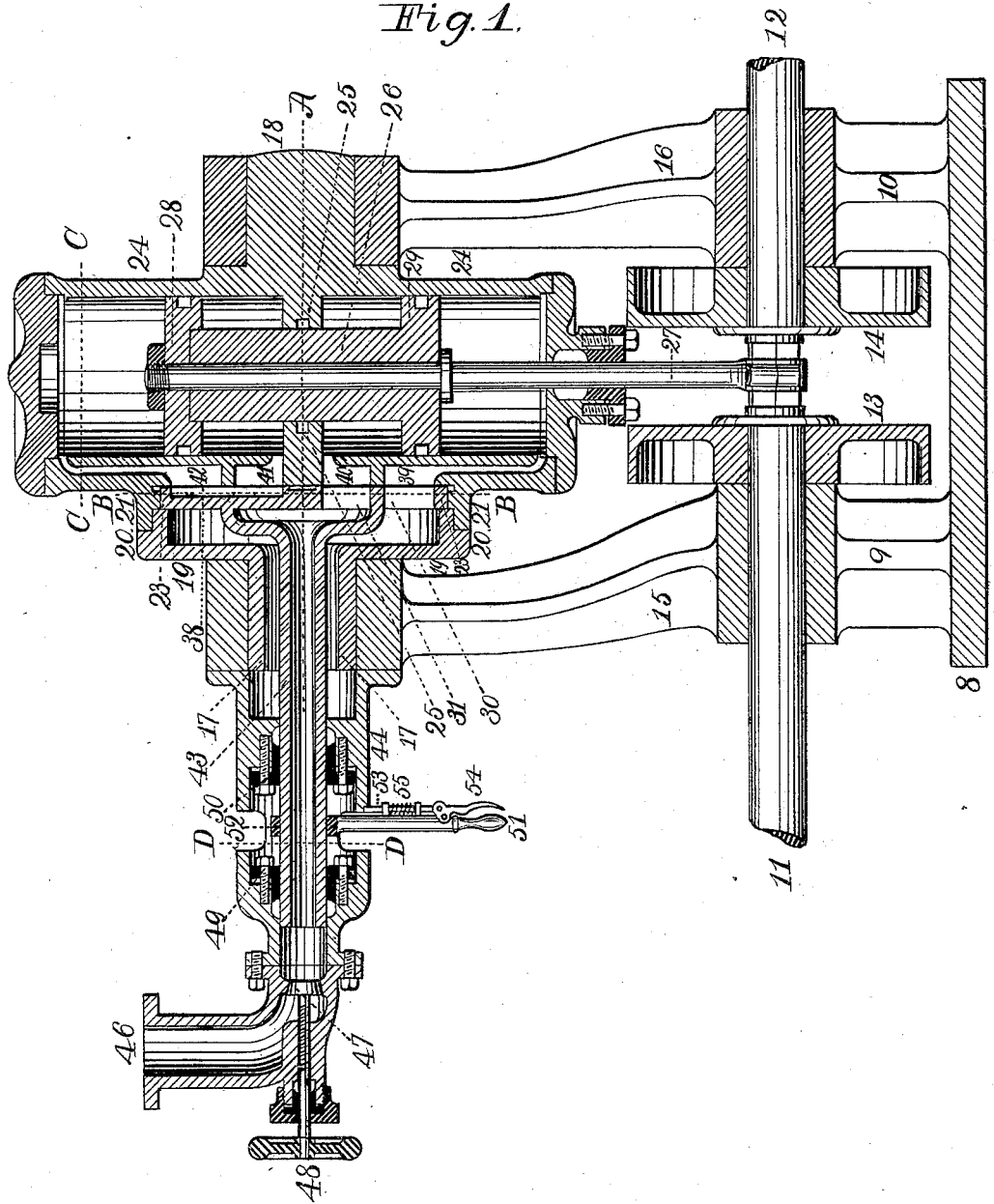
Figure 2:
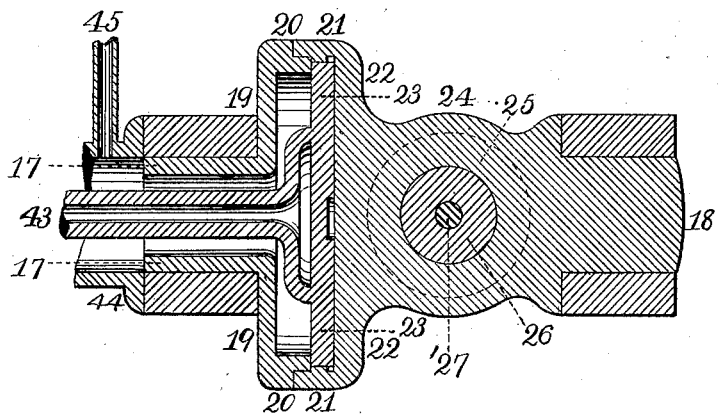
Figure 3:
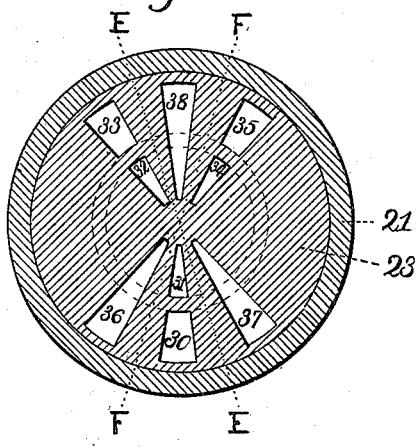
Figure 4:
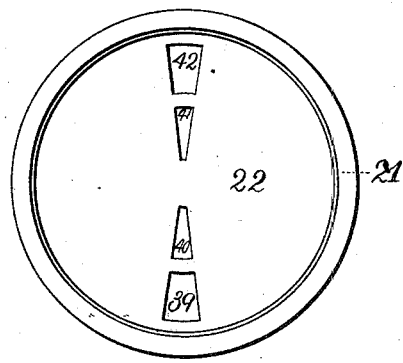
Figure 6:
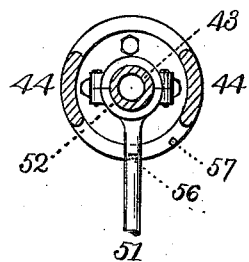
Figure 5:
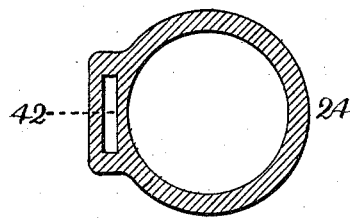

Figure 1 in the drawings is an upright central section of the engine. Fig. 2 is a horizontal section on line A of Fig. 1. Fig. 3 is a cross-section, looking toward the right on line B B of Fig. 1. Fig. 4 is a side view, looking toward the right of the valve-seat 22. Fig. 5 is a horizontal section on line C C of Fig. 1. Fig. 6 is a cross-section, looking to the right on line D D of Fig. 1.

8 is the bed-plate of the engine, while 9 and 10 are standards supporting the bearings for the shafts 11 and 12, respectively. On the inner ends of these shafts the disks 13 and 14 are respectively keyed. They are connected by a crank-pin, which, in the drawings, is shown in superior conjunction with the shafts. 15 and 16 are standards supporting the bearings in which the journals 17 and 18 of the oscillating cylinder turn. The journal 17 is hollow, and is cast as one piece with the annular disk 19. That disk has a flange, 20, which is rigidly fastened to the flange 21 of the valve-seat 22 after the valve 23 has been adjusted to the valve-seat. The valve-seat is cast as one piece with the cylinder 24. The cylinder is furnished midway of its length with an annular partition, 25. Within the cylinder the piston 26 reciprocates, carrying the piston-rod 27 as it goes. The piston has two heads, 28 and 29. Each piston-head, and also the annular partition 25, is furnished with an annular groove for the insertion of packing. The valve 23 has the perforations 30, 31, 32, 33, 34, and 35, and the recesses 36, 37, and 38. These perforations and recesses are steam-ports. The valve-seat 22 has the perforations 39, 40, 41, and 42, which are also steam-ports. Within the hollow journal 17 is the tube 43. Its right-hand end is expanded like the mouth of a trumpet, and is incorporated with the valve 23 on the circle indicated by the dotted lines in Fig. 3. Rigidly bolted to the bearings in which the journal 17 turns is the irregular tubular casing 44. The escape-pipe 45 leads away from the interior of the casing near its right-hand end, while the induction-pipe 46, which brings the steam from the boiler, is bolted to its left-hand end. Within the induction-pipe is the throttle-valve 47, worked by the wheel 48. The tubular casing 44 has its upper and lower walls cut away at and about the line D D, but is tubular on both sides of the parts so cut away. The tube 43 oscillates within the tubular casing 44, and withing the stuffing-boxes 49 and 50. The lever 51 is attached by the clamp 52 to the tube 43. Attached to the lever is the dog 53, worked by the handle 54 and the spring 55. The dog shuts into the notch 56 or the notch 57 in the casing 44, as hereinafter explained.

The mode of operation of this engine is as follows: Assuming the crank-pin to be in the position shown in Fig. 1 and the dog 53 to be in the notch 56, the lever 51 will be hanging directly downward from the tube 43, and the valve 23 will be in such a position that an imaginary line across it, coincident with the dotted line E E of Fig. 3, will be perpendicular. Inasmuch as in the assumed position of the crank-pin the upper end of the cylinder will be inclined toward the beholder at an angle of about eighteen degrees from the vertical, the ports 39, 40, 41, and 42, which are always on a line with the axis of the cylinder, will be opposite the ports 30 and 31 and the port 38, respectively, as shown in Fig. 1. In this situation of the parts live steam is admitted to the tube 43 through the throttle-valve 47 and the left-hand end of the casing 44. The steam passes from the tube 43, through the ports 31 and 40, into that part of the cylinder between the annular partition 25 and the lower piston-head, where it forces the piston to the bottom of its stroke, and when the piston is at the bottom of its stroke the cylinder is in a vertical position and the ports in the valve-seat are cut off from all communication with the ports in the valve. The momentum of the disks or other well-known means of carrying engine-cranks past their centers thereupon causes the piston to begin its upward stroke, and as it does so to oscillate the cylinder, so as to bring the ports 39 and 40 opposite the port 37, and the ports 41 and 42 opposite the ports 32 and 33, respectively. Thus the live steam being shut off from the port 40 is sent through the ports 32 and 41 into that part of the cylinder which is between the annular partition and the upper piston-head. At the same time the steam just used in that part of the cylinder between the annular partition and the lower piston-head passes back through the port 40 into the port 37, and thence into the port 39, and thence into that part of the cylinder below the piston. Thus the live steam and the steam already once used co-operate to force the piston to the top of its stroke. Thereupon the cylinder oscillates back to the position shown in Fig. 1, and the live steam again is shut off from the port 41 and again passes through the ports 31 and 40 into that part of the cylinder between the annular partition and the lower piston-head. At the same time the steam just used between the annular partition and the upper piston-head passes through the ports 41, 38, and 42 into that part of the cylinder above the piston and co-operates with the live steam to drive the piston to the bottom of its stroke, while the steam twice used passes from the bottom of the cylinder through the ports 39 and 30 into the hollow journal 17, and thence through the tubular casing 44 and the escape-pipe 45 into the open air. Then the cylinder oscillates to its other position, when the live steam, being again shut off from the port 40, is sent through the ports 32 and 41 into that part of the cylinder which is between the annular partition and the upper piston-head, while the steam just used between the annular partition and the lower piston-head passes back through the port 40 into the port 37, and thence through the port 39 into that part of the cylinder below the piston, where it co-operates with the live steam in forcing the piston to the top of its stroke. At the same time the steam in that part of the cylinder above the piston passes through the ports 42 and 33 into the hollow journal 17, and thence through the tubular casing 44 and the escape-pipe 45 into the open air. Thus the engine continues to operate as long as it continues to receive steam, and the valve 23 continues unchanged in position.

This engine may be reversed at any time by withdrawing the dog 53 from the notch 56, and moving the lever 51 far enough to bring the dog opposite the notch 57, and inserting the dog in that notch. This operation causes a revolution of the tube 43 and of the valve 23 about one-tenth of their circumferences, and thus brings the valve into such a position that an imaginary line across it, coincident with the line F F in Fig. 3, is perpendicular. Thereupon the ports 32, 33, and 37 become inoperative, and the ports 34, 35, and 36, theretofore idle, are brought into operation. The port 38 takes the position, relatively to the valve-seat, of the ports 32 and 33, and the ports 34 and 35 take the position of the port 38, while the ports 30 and 31 take the position of the port 37, and the port 36 takes the position of the ports 30 and 31.

This engine may be variously modified without altering its distinguishing character. For example, the cylinder may be stationary instead of oscillating, and the valve 23 be oscillated instead of the cylinder by any one of several methods known to the art of opening and closing engine-valves. So, also, the ports 34, 35, and 36 may be omitted, if the user does not desire any means to reverse his engine, or prefers to reverse it by some other means than the change of position of the valve 23 relatively to the valve-seat.

I recommend the maker of this engine to so proportion the diameter of the body of the piston to the diameter of the interior of the cylinder as that the upper side of the upper piston-head will have about four times as much surface as the exposed part of its lower surface.

I claim as my invention—

1. The combination of the cylinder 24, having the annular partition 25, with the piston 26, having the piston-heads 28 and 29, and with the valve-seat 22, having the ports 39, 40, 41, and 42, and with the valve 23, having the ports 30, 31, 32, 33, 37, and 38.

2. The combination of the valve-seat 22, having the ports 39, 40, 41, and 42, with the valve 23, having the ports 30, 31, 32, 33, 37, and 38.

WILBUR L. SHEPARD.

Witnesses:
ALBERT H. WALKER,
WILLARD EDDY.